United States Patent
Uppalli et al.

(10) Patent No.: US 9,118,587 B2
(45) Date of Patent: *Aug. 25, 2015

(54) NETWORK MULTI-PATH DISCOVERY (71) Applicant: Riverbed Technology, Inc., San Francisco, CA (US)

(72) Inventors: Raghavendra Uppalli, Cary, NC (US); James Mark Shaw, Cary, NC (US); Pradeep Natarajan, Raleigh, NC (US); Alain Cohen, McLean, VA (US)

(73) Assignee: RIVERBED TECHNOLOGY, INC., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/242,200

(22) Filed: Apr. 1, 2014

(65) Prior Publication Data

US 2014/0211805 A1 Jul. 31, 2014

Related U.S. Application Data (63) Continuation of application No. 13/210,351, filed on Aug. 15, 2011, now Pat. No. 8,724,494, and a continuation-in-part of application No. 12/900,357, filed on Oct. 7, 2010, now Pat. No. 9,014,012.

(60) Provisional application No. 61/374,064, filed on Aug. 16, 2010, provisional application No. 61/249,287, filed on Oct. 7, 2009, provisional application No. 61/374,064, filed on Aug. 16, 2010.

(51) Int. Cl.
*H04L 12/26* (2006.01)
*H04L 12/721* (2013.01)
*H04L 12/24* (2006.01)

(52) U.S. Cl.
CPC ............ *H04L 45/26* (2013.01); *H04L 41/12* (2013.01); *H04L 41/0213* (2013.01)

(58) Field of Classification Search
None
See application file for complete search history.

(56) References Cited

U.S. PATENT DOCUMENTS

| | | | |
|---|---|---|---|
| 6,538,997 B1 * | 3/2003 | Wang et al. ............... | 370/241 |
| 7,293,106 B2 | 11/2007 | Natarajan et al. | |
| 7,616,579 B2 | 11/2009 | Pittelli et al. | |
| 7,742,426 B2 | 6/2010 | Schumacher et al. | |
| 7,760,735 B1 | 7/2010 | Chen et al. | |
| 7,817,578 B2 | 10/2010 | Bivens et al. | |
| 7,821,966 B2 | 10/2010 | Beygelzimer et al. | |
| 7,924,722 B2 | 4/2011 | Thubert et al. | |
| 7,961,626 B2 | 6/2011 | Reeve | |
| 7,983,175 B2 | 7/2011 | Gale et al. | |
| 7,990,877 B2 | 8/2011 | Lu | |
| 8,040,792 B2 * | 10/2011 | Hanif et al. ............... | 370/218 |

(Continued)

Primary Examiner — Chi H Pham
Assistant Examiner — Soon-Dong D Hyun
(74) Attorney, Agent, or Firm — Park, Vaughan, Fleming & Dowler LLP (57) ABSTRACT

Potential paths between a source and destination of a network are identified based on trace-route information, then filtered to eliminate paths or links that are not supported by ancillary information associated with the network so as to identify feasible/actual paths between the source and destination. The ancillary information includes, for example, routing tables and ARP tables. If a feasible path cannot be identified based on the ancillary information, supplemental information regarding nodes further along the potential path is assessed to provide a basis for inferring the nodes that may provide a feasible path. The determined feasible paths are displayed for review, and provided to serve as filters for subsequent path-analysis tools.

20 Claims, 3 Drawing Sheets

(56) References Cited

U.S. PATENT DOCUMENTS

| | | |
|---|---|---|
| 8,130,657 B2 | 3/2012 | Mosko |
| 8,264,955 B2 | 9/2012 | Chao et al. |
| 8,374,086 B2 | 2/2013 | Marr et al. |
| 8,719,398 B2 | 5/2014 | Qian et al. |
| 2007/0258382 A1* | 11/2007 | Foll et al. ............. 370/252 |
| 2009/0285124 A1* | 11/2009 | Aguirre et al. ........ 370/255 |
| 2010/0008233 A1* | 1/2010 | Ee et al. .............. 370/241 |

* cited by examiner

NETWORK MULTI-PATH DISCOVERY

This application is a continuation of U.S. patent application Ser. No. 13/210,351, filed 15 Aug. 2011, which claims the benefit of U.S. Provisional Patent Application 61/374,064, filed 16 Aug. 2010, and is a continuation-in-part of copending patent application 12/900,357 filed 7 Oct. 2010, incorporated by reference herein, which claims the benefit of U.S. Provisional Patent Applications 61/249,287, filed 7 Oct. 2009, and 61/374,064, filed 16 Aug. 2010.

BACKGROUND AND SUMMARY OF THE INVENTION

This invention relates to the field of network analysis, and in particular to a system and method that facilitate the discovery of nodes along multiple paths of a network application, or between any two identified nodes, and the subsequent presentation of these multiple paths.

There are two common techniques used to determine the network layer path between a source node and a destination node, an 'active' technique that includes sending trace messages from the source node to the destination, and a 'passive' technique that includes sequentially investigating the configuration of the routers to determine the 'next hop' toward the destination.

U.S. Pat. No. 7,742,426, "SYSTEM, METHOD, AND COMPUTER-READABLE MEDIUM FOR DETERMINING A LAYER-2 TRACE IN A HETEROGENEOUS NETWORK SYSTEM", issued 22 Jun. 2010 to Schumacher et al., discloses using a trace request to identify the network layer path between a pair of nodes, then finding the layer-2 devices along each of the identified links forming the path, and is incorporated by reference herein.

U.S. Pat. No. 7,293,106, "METHOD OF FINDING A PATH BETWEEN TWO NODES IN A NETWORK", issued 6 Nov. 2007 to Natarajan et al. and incorporated by reference herein, discloses sequentially identifying each next hop based on routing tables, and identifying the data link layer devices along the hop based on a network topology database.

U.S. Pat. No. 7,760,735, "METHOD AND SYSTEM FOR DISCOVERING NETWORK PATHS", issued 20 Jul. 2010 to Chen et al. and incorporated by reference herein, discloses querying network devices for their current configuration, including routing tables, and sequentially proceeding along the path identified by the next-hop information, using interface definitions at each device to identify the data link layer devices along the path.

In the above referenced parent application to this application, it is noted that while these prior art systems are effective for finding devices along a path between two nodes, they each rely on having access to certain features or capabilities that may or may not be available to a particular network manager. For example, the techniques based on trace information assume that the path between source and destination can be determined by the trace information, and the techniques based on routing information assume that the path between source and destination can be determined by the source information. To accommodate the situations where neither of these presumptions are applicable, the parent application to this application presents a 'hybrid' approach that, for example, attempts to use the simpler tracing approach until it fails, then switches to the routing approach to continue the path determination, then alternates and/or combines the two approaches, and others, until the path between the indicated source and destination nodes is determined.

The applicants have recognized a number of deficiencies associated with the aforementioned path determination techniques based on conventional trace information. In particular, an indicated path as reported by a trace report produced by the traditional 'trace-route' or 'tracert' commands may not, in fact, exist. Accordingly, performance statistics and other parameters developed based on these non-existent paths, which are often used to diagnose performance problems, may be meaningless, and often misleading.

In particular, if multiple paths exist between the source and destination, care must be taken in the analysis of performance related information to assure that the information is applicable to an actual path between the source and destination, and not a path that cannot be realized by the existing network.

It would be advantageous to be able to identify multiple paths between a source and destination based on conventional trace information. It would also be advantageous to distinguish feasible/actual paths between the source and destination from among the identified possible multiple paths. It would also be advantageous to present a display of the feasible/actual paths, with performance statistics associated with each path.

These advantages, and others, can be realized by a system and method that identifies the potential paths between a source and destination of a network based on trace-route information, then filters these paths based on ancillary information associated with the network to eliminate paths or links that are not supported by this ancillary information so as to identify feasible/actual paths between the source and destination. The ancillary information includes, for example, routing tables and ARP (Address Resolution Protocol) tables. If a feasible path cannot be identified based on the ancillary information, supplemental information regarding nodes further along the potential path is assessed to provide a basis for inferring the nodes that provide the path. The determined feasible paths are displayed for review, and provided to serve as filters for subsequent path-analysis tools.

BRIEF DESCRIPTION OF THE DRAWINGS

The invention is explained in further detail, and by way of example, with reference to the accompanying drawings wherein.

Throughout the drawings, the same reference numerals indicate similar or corresponding features or functions. The drawings are included for illustrative purposes and are not intended to limit the scope of the invention.

DETAILED DESCRIPTION

In the following description, for purposes of explanation rather than limitation, specific details are set forth such as the particular architecture, interfaces, techniques, etc., in order to provide a thorough understanding of the concepts of the invention. However, it will be apparent to those skilled in the art that the present invention may be practiced in other embodiments, which depart from these specific details. In like manner, the text of this description is directed to the example embodiments as illustrated in the Figures, and is not intended to limit the claimed invention beyond the limits expressly included in the claims. For purposes of simplicity and clarity, detailed descriptions of well-known devices, circuits, and methods are omitted so as not to obscure the description of the present invention with unnecessary detail.

The 'trace-route' operation is a common utility on most computer operating systems. In the Microsoft Windows operating system, the command "tracert <destination address>" will return a "trace" of the path that an internally generated message takes as it travels to the destination. Typically the time associated with the sending of three such messages are reported for each 'hop' along the path, a 'hop' being defined as a connection/link between two network level devices, typically each router between the source and destination nodes.

It is generally assumed that the output from a 'trace-route' operation indicates the actual path that each of 'the three generated messages' traveled as they progressed from the source to the destination. This is not a correct assumption.

Although the output of the trace-route operation appears to represent the progress of three messages across the network from the source to the destination, it actually represents multiple sets of three messages, each set being independent of each other, as detailed below.

The first set of messages is sent with a "Time to Live" (TTL) parameter set to one (1). In accordance with the IP protocol, the TTL parameter is decremented by one at each receiving router, and when the TTL parameter reaches zero, the receiving router does not forward the message, and returns an error report, indicating that the message could not be forwarded. Accordingly, the first router will return this error report, and will not forward the message. When the trace-route operation receives this error report, it notes the time of receipt, which is, relative to the time that the message was sent, a measure of the round trip time between the source and the first router along the path to the destination.

The second set of messages is sent with the TTL parameter set to two (2). The first router will decrement this value to one (1), and pass it to the next router along the path to the destination. At the second router, the TTL parameter will be decremented to zero (0) and the second router does not forward the message, and returns an error report, indicating that the message could not be forwarded. When the trace-route operation receives this error report, it notes the time of receipt, which is, relative to the time that the message was sent, a measure of the round trip time between the source and the second router along the path to the destination.

Each of the next sets of messages are sent with incrementally increasing values of the TTL parameter, so that the trace-route operation is able to determine the round trip time between the source and each of the subsequent routers along the path to the destination, until, eventually, the destination reports an acknowledgement of receipt of the message.

While the above description of the output of a trace path operation would presumably provide a trace of the actual path that each message traveled, this presumption is unfounded. Because each message of each set of messages with differing TTL parameters is sent independent of each other message of each set of messages, the TTL-error report from each router is independent of any previous or subsequent TTL-error report from any other router. The consequence of ignoring this independence is illustrated in FIG. 2A, with respect to the network of FIG. 1A.

Figure 1A:
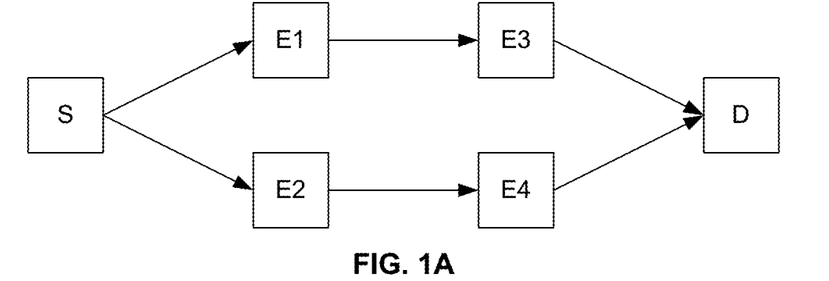
FIG. 1A illustrates an example multiple-path network between a source and destination.
Figure 1B:
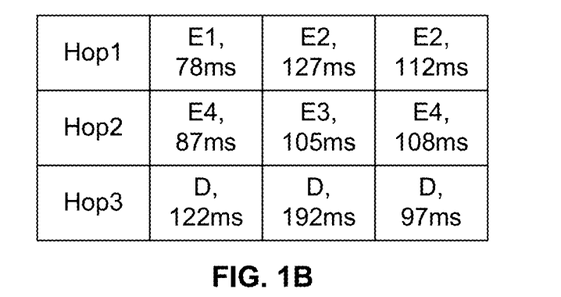
FIG. 1B illustrates an example result from a trace-route execution between the source and destination.
Figure 2A:
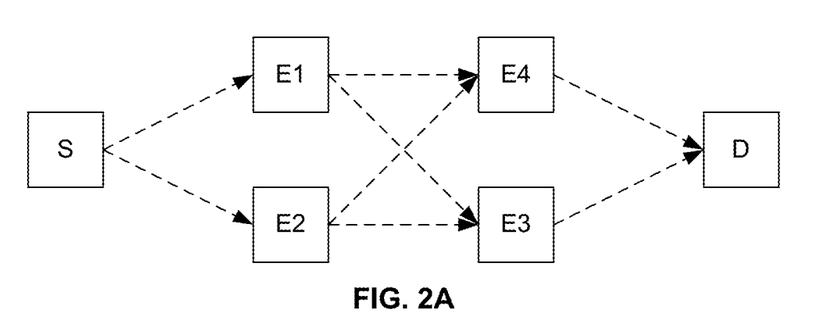
FIGS. 2A illustrates potential paths between the source and destination based on the example trace-route results.

FIG. 1A illustrates an example network having multiple paths between source S and destination D. FIG. 1B illustrates an example result of a trace-route operation from source S to destination D.

In this example, FIG. 1B illustrates that in response to a trace-route operation from source S to destination D, a first message from source S to destination D with a TTL of one is returned from node E1 after 78 ms; a second message with a TTL of one is returned from E2 after 127 ms; and a third message with a TTL of one is returned from E2 after 112 ms. Similarly, a fourth message with a TTL of two is returned from node E4 after 87 ms; a fifth message with a TTL of two is returned from node E3 after 105 ms; and a sixth message is returned from node E4 after 108 ms. Seventh, eighth, and ninth messages are returned from node D after 122 ms, 192 ms, and 97 ms, respectively. (Conventional trace-route output reports may not expressly identify the nodes that differ from the first responding node at a hop, and may merely report this inconsistency as a "*" in the field associated with the response time at that hop. However, the trace-route process will have this information, and one of skill in the art will certainly be able to provide a trace-route operation that includes the details associated with each returned message at each hop.)

It is significant to note that although the trace-route results may appear to indicate that a message traveled from source S to source D over a path S-E1-E4-D, based on the first column of response time, and a path S-E2-E3-D based on the second column of response time, and a path S-E2-E4-D based on the third column of response times, any assumptions regarding the particular path that any particular message traveled from source S to destination D based on trace-route results would be unfounded, because each and every one of the reported trace-route returns is independent of each of the other returns. This is clearly evident in the fact that some of the reported times at the second hop were 'sooner' than the reported times at the first hop, and one of the reported times at the third hop was sooner than both of the reported times at the first and second hops.

FIG. 2A illustrates an example network path diagram that could be deduced based on the example result of a trace-route operation between the source S and the destination D illustrated in FIG. 1B.

Of particular note, because each reported response time is independent of each other reported response time, the fact that E1 and E2 appeared at the first hop, and E3 and E4 appeared at the second hop, it must be assumed, based on the trace-route result, that E1 may be connected to both E3 and E4, and that E2 may also be connected to both E3 and E4. However, any subsequent analysis that is based on an assumption that paths S-E1-E4-D and/or S-E2-E3-D exist would be unfounded, because, in the example of FIG. 1A, these paths do not exist.

In accordance with this invention, the results of a trace-route operation are subsequently assessed to determine which of the potential paths suggested by the trace-route results are 'feasible', a feasible path being defined as one that is supported by ancillary information, such as routing tables, ARP tables, and/or other device configuration data. If no ancillary information is found for a particular link in a path between the source and destination, that link is eliminated from the assumed connections/paths between the source and destination.

Figure 2B:
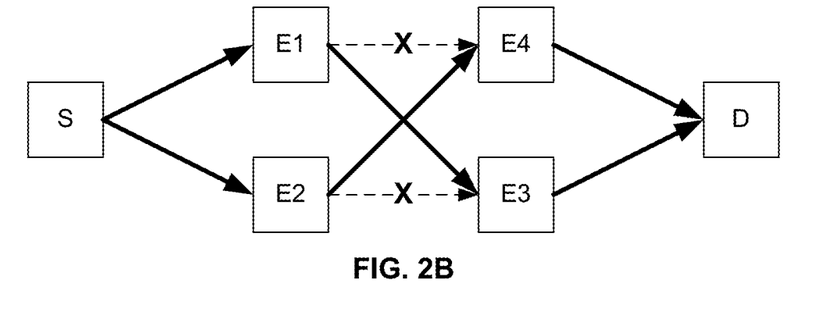
FIG. 2B illustrates a filtering of these paths based on supplemental analysis in accordance with principles of this invention.

If the network that produced the trace-route results in FIG. 1B corresponds to the network of FIG. 1A, there will be ancillary information to support the link between E1 and E3, and E2 and E4, and there will be no ancillary information to support the link between nodes E1 and E4, and no ancillary information to support the link between nodes E2 and E3. Using this ancillary information, the feasible paths (S-E1-E3-D,S-E2-E4-D) between the source S and destination D will be determined, as illustrated in FIG. 2B.

Figure 3:
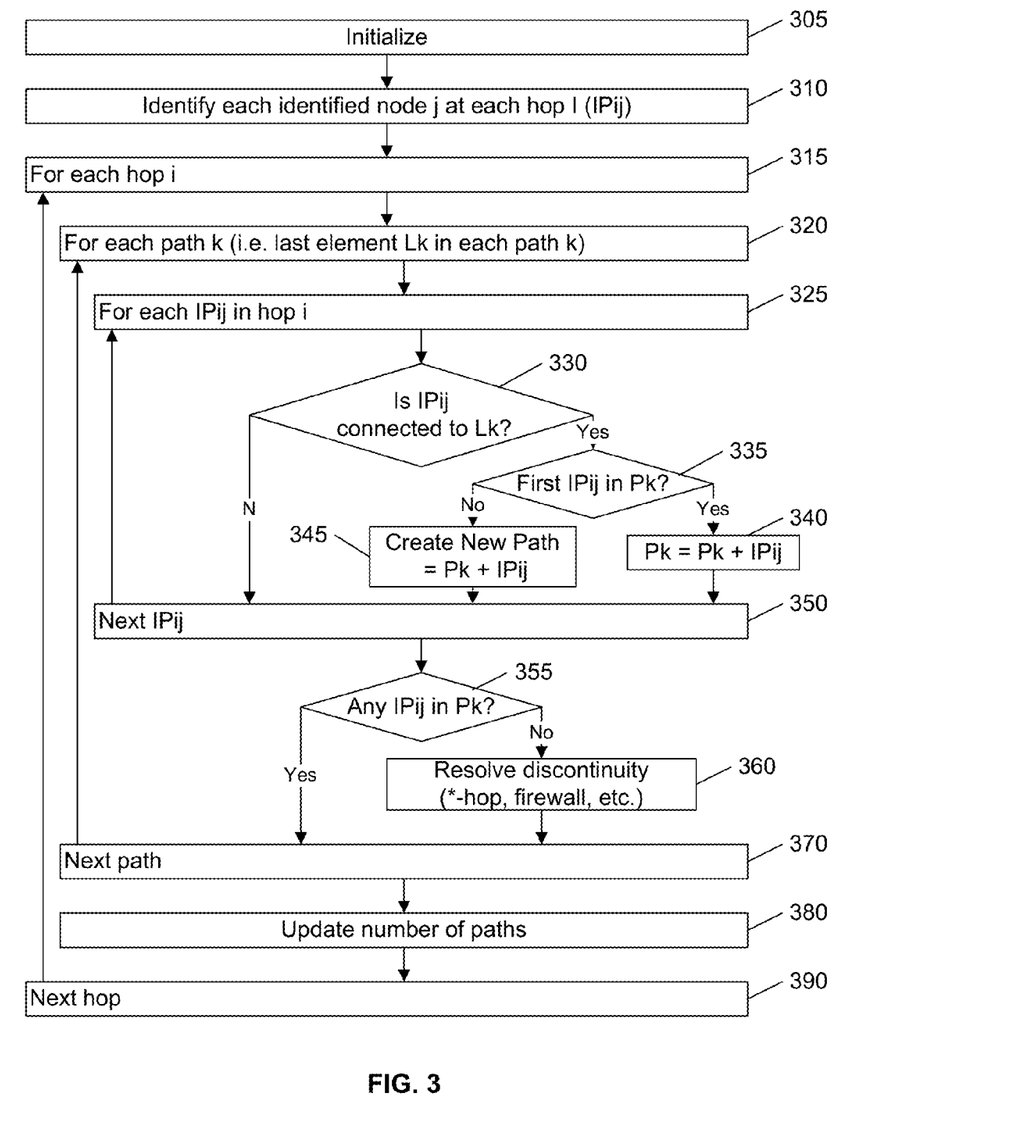
FIG. 3 illustrates an example flow diagram for identifying feasible paths between the source and the destination based on the trace results and supplemental analysis.

FIG. 3 illustrates an example flow diagram for identifying feasible/realizable paths within a network based on trace-route results and ancillary information.

At 305, a number of initialization operations are performed, typical of any processing operation. For example, initially, the number of paths is set to the number of nodes identified at the first hop, because the source must be connected to each of these nodes, and each path is set to include the source S and the nodes at the first hop; in like manner, the maximum number of hops identified in the trace-route data is identified. Although not specifically identified in FIG. 3, each "For-Next" loop may include conventional initialization and termination operations, such as clearing flags or other parameters that may have been set in the prior iteration, storing results from each iteration, and so on.

At 310, the trace-route information is assessed to determine each IP address associated with each link/hop. Using the example of the trace-route results of FIG. 1B, the IP addresses of E1 and E2 would be associated with the first hop, the IP addresses of nodes E3, E4 will be associated with the second hop, and the IP address of node D would be associated with the third hop.

At the loop 315-390, each hop, starting from the first hop, is processed to determine the progression of existing paths and/or creation of new paths at that hop. Each existing path $P_k$ (initially each path from the source S to the first hop) is assessed via the loop 320-380, using the last element $L_k$ in the path to determine which nodes associated with the next hop are to be added to this path.

At the loop 325-350, each of the nodes j associated with hop i (IPij) is assessed to determine, at 330, whether this node IPij is connected to the last element $L_k$ on the path $P_k$. It is significant to note that merely determining whether IPij is included as a next-hop in the routing tables of Lk is not sufficient to determine whether IPij is connected to Lk, because the routing tables of Lk merely identify the current routing, and not all possible routings.

Instead of relying solely on the routing tables of Lk, other configuration information at Lk may be used, such as Lk's ARP table. A node's ARP table includes a mapping between an IP address and a particular device's physical (MAC) address. An entry in a node's ARP table is only created when the node requires that physical address; that is, only when that node is required to connect to a device corresponding to that particular IP address. While a device's routing table may be dynamically updated to identify a particular IP address for making a particular connection, and therefore not identify an alternative IP address for making that connection, the device's ARP table will generally include any of the IP addresses that had been used by the device, thereby supporting an assumption that a link between the node and that particular IP address exists.

Optionally, if a symmetric configuration is assumed, wherein a node that sends messages to another node is also able to receive messages from the other node, the configuration information associated with the current node IPij may be assessed to determine whether a connection to Lk had been established.

If all else fails, any existing supplemental models of the network may be assessed to determine whether a link is likely to exist between Lk and IPij.

Additionally, or alternatively, the trace-route command may be used to determine whether IPij and Lk are connected, or to verify the connection determined by the configuration information, above. That is, a trace-route command may be sent from the last element Lk to either the node IPij or the destination D. If the trace-route returns IPij as the first hop, then it is known that Lk and IPij are directly connected. In like manner, if a symmetric configuration is assumed, sending a trace-route command from IPij to Lk or the source S may be used to determine if Lk and IPij are directly connected.

If it is not possible to send a trace-route command from the intermediate nodes Lk or IPij, most embodiments of the trace-route function allow the user to specify a desired path, or partial path that the trace-route message should take. For example, the 'tracert' function permits the identification of intermediate nodes that the trace-route message should traverse on its way to the destination. If Lk is listed as an intermediate node, and IPij appears immediately after Lk in the trace-route output, it is determined that Lk and IPij are directly connected.

If, at 330, it is determined that IPij and Lk are connected, IPij should be added to the path Pk. However, if another node at this hop level has already been added to the path Pk, this additional link to Lk indicates the presence of multiple paths. Accordingly, at 335, it is determined whether this node IPij is the first node at this hop level that is associated with the last element Lk of the path Pk. If so, at 340, this node IPij is added to the path Pk, as P'k which replaces Pk at the end of the loop 320-370 (not explicitly illustrated). If a node at this hop level has already been added to the path Pk, a new path is created, corresponding to the existing path followed by this node IPij, at 345.

One of skill in the art will recognize that other information may be assessed to determine whether Lk and IPij are connected. For example, if a network model exists for the network, or a portion of the network, the information in that model may be used to determine if Lk and IPij are connected, or are likely connected. For example, the results of prior determinations of paths between a different source-destination pair may identify connections for a particular element Lk or IPij.

After processing all of the nodes IPij with respect to the last element Lk of a path Pk, it is determined whether any node has been added to this path Pk corresponding to this hop i, at 355. If not, since it is known that the current path Pk must be in some way connected to destination D, this apparent discontinuity is resolved at 360.

There are a number of reasons why two nodes would not appear to be linked.

For example, along the path to the destination, one or more nodes along the path may be configured not to respond with an error message when the TTL parameter is reduced to zero. In the traditional trace-route reports, the round trip time is reported as "*", and the corresponding unidentified hop is commonly termed a "*-hop". In such a case, since the node is unidentified, the nodes at the next hop after this unidentified node may be identified, and assessed to determine whether either the last element Lk or the next hop nodes contain a reference to each other, and whether this reference identifies an intermediate node between the two. If so, this intermediate node is identified as a member of each path that includes the *-hop node between the last element Lk and the next following node, replacing the *-hop node.

In like manner, if there is an identifiable firewall between the last element Lk in the path Pk and the current node IPij, the firewall may be added to the path Pk, between the last element Lk and the node IPij.

Upon identifying all of the nodes that are connected to the last element Lk of each of the paths, and creating new paths as appropriate, the set of paths to be analyzed for the next hop is updated to reflect the updated information for each of the assessed paths and newly created paths, at 380.

The process is repeated, at 390, for each of the remaining hops toward the destination. Upon completion of this process for all hops, the determined paths are stored for subsequent use, by this analysis program, as well as others. As discussed above, for example, the determined paths between a first source-destination pair may include elements that are common to one or more paths between a second source-destination pair.

Additionally, the determined paths between the source and destination may be presented to the user, in any of a variety of forms, ranging from a simple set of path lists to a graphic presentation of the paths among multiple source-destination pairs. The set of determined paths may also be ranked and/or filtered according to certain criteria. For example, a single highest ranking path may be determined and presented to the user, wherein a path's ranking is based on the reliability of the ancillary or supplemental information used in its computation. Current routing and ARP table information may, for example, be considered more reliable than information gathered from a previously stored network model.

Figure 4:
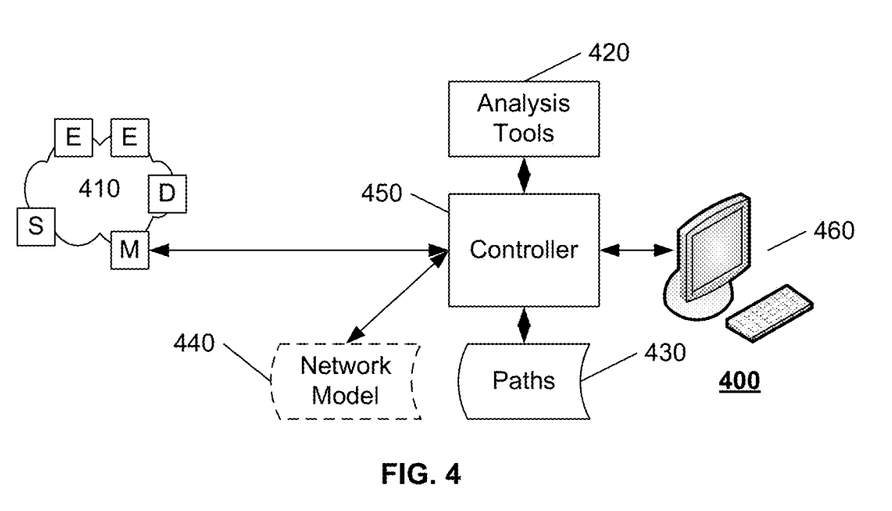
FIG. 4 illustrates an example block diagram of a network analysis system that determines feasible paths between a source and destination based on the trace results and supplemental analysis.

FIG. 4 illustrates an example block diagram of a network analysis system 400 for determining multiple paths between a source node S and a destination node D on a network 410. These nodes S, D communicate via a communications path that includes one or more intermediate elements E. These elements E may include routers that dynamically determine the path between the source S and destination D using, for example, routing tables that indicate a next hop (next element E) associated with an address corresponding to destination D. The address corresponding to destination D may be the actual IP address of destination D, a translation of the IP address of destination D, a virtual IP address of destination D, and so on.

A controller 450 of the network analysis system 400 communicates with a monitor M that is also on the network 410, so as to be able to communicate with at least some of the elements E. The controller 450 also communicates with analysis tools 420 that perform some or all of the path determination tasks detailed above. The controller 450 interacts with a user of the system 400 via a user interface 460.

Although the components of this system are illustrated as individual blocks, for ease of understanding, one of skill in the art will recognize that the functional partitioning may be changed, depending upon the particular embodiment of this invention. For example, the monitor M is shown separate from the controller 450 and other components in the system 400, although in many embodiments the monitor M and the controller 450 may be one integrated component in the system 400. In an alternative embodiment, the monitor M may, in fact, be multiple monitors that are distributed about the network 410. In such an embodiment, some of the monitoring functions may be performed by the controller 450, leaving the monitors to perform a limited set of these monitoring functions. In like manner, the determined paths 430 may be stored in a network model 440 that contains other information related to the elements of the network.

The foregoing merely illustrates the principles of the invention. It will thus be appreciated that those skilled in the art will be able to devise various arrangements which, although not explicitly described or shown herein, embody the principles of the invention and are thus within its spirit and scope. For example, in the above examples, the traditional 'three executions per trace-route operation' (i.e. obtaining three results at each hop) provides the identification of multiple nodes at each hop. One of skill in the art will recognize that the identification of multiple nodes at each hop need not be dependent upon exactly three returns per trace-route operation. For example, the conventional trace-route operation may be modified to transmit 'N' sets of messages, each message in each set having an incrementally increasing TTL value, or, multiple 'three returns per trace-route operations' may be performed, and any node that responds in any of these operations for a given hop will be recorded as a node associated with that hop.

In like manner, although the network analysis system in the above examples is configured to determine the multiple paths between a source and destination based on information obtained from trace-route returns and ancillary information from an actual network, one of skill in the art will recognize that some or all of the processes described above may be performed based on information obtained from a model 440 of an actual (or hypothesized) network. In an extreme case, for example, the trace results may be obtained from a simulation of the execution of trace operations on the network model, and the ancillary information may be obtained from the configuration information of the identified nodes in the network model. In an alternative case, the trace results may be obtained from the actual network, and some or all of the configuration information may be obtained from the network model, such as explicit identifications of determined or created paths. Any and all combinations of actual and simulated data may be used to determine the feasibility of paths deducible from trace-route results.

These and other system configuration and optimization features will be evident to one of ordinary skill in the art in view of this disclosure, and are included within the scope of the following claims.

In interpreting these claims, it should be understood that:

a) the word "comprising" does not exclude the presence of other elements or acts than those listed in a given claim;

b) the word "a" or "an" preceding an element does not exclude the presence of a plurality of such elements;

c) any reference signs in the claims do not limit their scope;

d) several "means" may be represented by the same item or hardware or software implemented structure or function;

e) each of the disclosed elements may be comprised of hardware portions (e.g., including discrete and integrated electronic circuitry), software portions (e.g., computer programming), and any feasible combination thereof.

f) hardware portions may include a processor, and software portions may be stored on a non-transitory computer-readable medium, and may be configured to cause the processor to perform some or all of the functions of one or more of the disclosed elements;

g) hardware portions may be comprised of one or both of analog and digital portions;

h) any of the disclosed devices or portions thereof may be combined together or separated into further portions unless specifically stated otherwise;

i) no specific sequence of acts is intended to be required unless specifically indicated; and j) the term "plurality of" an element includes two or more of the claimed element, and does not imply any particular range of number of elements; that is, a plurality of elements can be as few as two elements, and can include an immeasurable number of elements.

We claim:

1. A non-transitory computer-readable medium that includes a program that, when executed by a processor, causes the processor to:
   access first and second trace results related to each of a first and a second trace operation that each define one or more hops of at least a portion of a path between a source node to a destination node;
   identify a pair of corresponding hops in the first and second trace results that include a first node in the first trace result that is different from a second node in the second trace result;
   determine a first identified path from the source node toward the destination node that includes the first node, and a second identified path from the source node toward the destination node that includes the second node; and
   store the first and second identified paths in a non-transitory computer-readable memory for subsequent analysis and display.

2. The medium of claim 1, wherein each of the first and second identified paths includes a last element associated with a given hop, and the program cause the processor to:
   identify each of the nodes associated with a next hop after the given hop from the trace results, and
   for each of the first and second identified paths:
      identify each connected node of the nodes associated with the next hop that is connected to the last element of the identified path,
      augment the identified path to include a first connected node associated with the next hop, and
      for each other connected node, if any:
         create a new identified path that includes the identified path up to the given hop, and the other connected node.

3. The medium of claim 2, wherein the program causes the processor to identify at least one of the connected nodes by assessing configuration information associated with at least one of: the last element, and one or more nodes associated with the next hop.

4. The medium of claim 2, wherein the program causes the processor to identify at least one of the connected nodes by obtaining subsequent trace results that are based on a trace operation that identifies the last element of the identified path.

5. The medium of claim 2, wherein the program causes the processor to identify at least one of the connected nodes by assessing one or more previously determined paths in the network.

6. The medium of claim 2, wherein, if no connected nodes are found, the program causes the processor to resolve this lack of connectivity by finding at least one element at a subsequent hop after the next hop that is connected to the last element, and inferring an identity of a node at the next hop that provides connectivity between the last element and the element at the subsequent hop.

7. The medium of claim 1, wherein the program causes the processor to determine at least one of the first and second identified paths by a process that includes obtaining subsequent trace results based on a trace operation that identifies a last element of the first identified path immediately prior to the first node.

8. The medium of claim 1, wherein the program causes the processor to determine at least one of the first and second identified paths by a process that includes assessing one or more previously determined paths in the network.

9. The medium of claim 1, wherein the program causes the processor to determine at least one of the first and second identified paths by a process that includes resolving a lack of connectivity to at least one of the first and second nodes by finding at least one element at a subsequent hop after the same hop that is connected to an element prior to the at least one of the first and second nodes, and inferring an identity of the element prior to the at least one hop that provides connectivity to the at least one of the first and second nodes.

10. A method comprising:
   accessing, by a network analysis system, first and second trace results related to each of a first and a second trace operation that each define one or more hops of at least a portion of a path between a source node to a destination node;
   identifying, by the network analysis system, a pair of corresponding hops in the first and second trace results that include a first node in the first trace result that is different from a second node in the second trace result;
   determining, by the network analysis system, a first identified path from the source node toward the destination node that includes the first node, and a second identified path from the source node toward the destination node that includes the second node; and
   storing, in a memory of the network analysis system, the first and second identified paths for subsequent display and analysis.

11. The method of claim 10, wherein each of the first and second identified paths includes a last element associated with a given hop, and the method includes:
   identifying each of the nodes associated with a next hop after the given hop from the trace results, and
   for each identified path:
      identifying each connected node of the nodes associated with the next hop that is connected to the last element of the identified path,
      augmenting the identified path to include a first connected node associated with the next hop, and
      for each other connected node, if any:
         creating a new identified path that includes the identified path up to the given hop, and the other connected node.

12. The method of claim 11, wherein the method includes identifying at least one of the connected nodes by assessing configuration information associated with at least one of: the last element, and one or more nodes associated with the next hop.

13. The method of claim 11, wherein, if no connected nodes are found, the method includes resolving this lack of connectivity by finding at least one element at a subsequent hop after the next hop that is connected to the last element, and inferring an identity of a node at the next hop that provides connectivity between the last element and the element at the subsequent hop.

14. The method of claim 10, wherein the method includes determining at least one of the first and second identified paths by a process that includes assessing one or more previously determined paths in the network.

15. The method of claim 10, wherein the method includes determining at least one of the first and second identified paths by a process that includes resolving a lack of connectivity to at least one of the first and second nodes by finding at least one element at a subsequent hop after the same hop that is connected to an element prior to the at least one of the first and second nodes, and inferring an identity of the element prior to the at least one hop that provides connectivity to the at least one of the first and second nodes.

16. A network analysis system comprising:
   a controller that is configured to access first and second trace results related to each of a first and a second trace operation that each define one or more hops of at least a portion of a path between a source node to a destination node;

one or more analysis tools that are configured to:
  identify a pair of corresponding hops in the first and second trace results that include a first node in the first trace result that is different from a second node in the second trace result; and
  determine a first identified path from the source node toward the destination node that includes the first node, and a second identified path from the source node toward the destination node that includes the second node;

a non-transitory computer-readable memory that is configured to store the first and second identified paths; and a display that is configured to illustrate the first and second identified paths.

17. The system of claim 16, wherein at least one of the analysis tools is configured to assess configuration information associated with the first node to facilitate determining the first identified path.

18. The system of claim 16, wherein at least one of the analysis tools is configured to obtain subsequent trace results to facilitate determining at least one of the first and second identified paths.

19. The system of claim 16, wherein at least one of the analysis tools is configured to assess one or more previously determined paths in the network to facilitate determining at least one of the first and second identified paths.

20. The system of claim 16, wherein at least one of the analysis tools is configured to determine at least one of the first and second identified paths by a process that includes resolving a lack of connectivity to at least one of the first and second nodes by finding at least one element at a subsequent hop after the same hop that is connected to an element prior to the at least one of the first and second nodes, and inferring an identity of the element prior to the at least one hop that provides connectivity to the at least one of the first and second nodes.

* * * * *